United States Patent [19]

Okamoto et al.

[11] Patent Number: 4,739,001
[45] Date of Patent: Apr. 19, 1988

[54] RUBBER-MODIFIED STYRENE RESIN COMPOSITION

[75] Inventors: Yasushi Okamoto; Yoshinori Kanno, both of Chiba, Japan

[73] Assignee: Sumitomo Chemical Co., Ltd., Osaka, Japan

[21] Appl. No.: 943,003

[22] Filed: Dec. 18, 1986

[30] Foreign Application Priority Data

Dec. 18, 1985 [JP] Japan ................... 60-285180

[51] Int. Cl.$^4$ ................... C08K 5/24; C08L 51/00
[52] U.S. Cl. ................... 524/264; 524/269; 525/64; 525/83; 525/84
[58] Field of Search ................... 524/264, 269; 525/64, 525/83, 84

[56] References Cited

U.S. PATENT DOCUMENTS 3,686,356  8/1972  Saam ................... 525/64
4,631,307 12/1986  Hosada ................... 524/269

FOREIGN PATENT DOCUMENTS 7170950 10/1982  Japan ................... 524/269
8089641  5/1983  Japan ................... 524/269
0217254 10/1985  Japan ................... 524/269

OTHER PUBLICATIONS

Kobunshi ("High Polymer"), vol. 6, No. 6, pp. 431–438, (1977).
Esbrite/Sumibrite brochure.

*Primary Examiner*—Joseph L. Schofer
*Assistant Examiner*—Peter D. Mulcahy
*Attorney, Agent, or Firm*—Sughrue, Mion, Zinn, Macpeak & Seas

[57] ABSTRACT

A rubber-modified styrene resin composition is disclosed, comprising (A) a rubber-modified styrene resin having dispersed therein from 1 to 15% by weight of a rubbery polymer having an average particle size of from 0.1 to 2.5 μm, (B) an organopolysiloxane in an amount of from 0.01 to 0.2% by weight on silicon conversion based on the rubber-modified styrene resin, and (C) an ethylene-unsaturated carboxylic acid ester copolymer in an amount of from 0.05 to 10% by weight based on the rubber-modified styrene resin. The composition exhibits markedly improved areal impact strength while retaining other physical properties and is, therefore, useful for exterior parts.

3 Claims, No Drawings

RUBBER-MODIFIED STYRENE RESIN COMPOSITION

FIELD OF THE INVENTION

This invention relates to a rubber-modified styrene resin composition having markedly improved impact strength. More particularly, it relates to a rubber-modified styrene resin composition having markedly improved impact strength while retaining other physical properties. The rubber-modified styrene resin composition of the invention can be made the best use of in the field of fabrication, taking advantage of styrene resins, such as fabrication of exterior parts, e.g., appliances, business and office machines, telephone sets, office automation equipments, etc.

BACKGROUND OF THE INVENTION

In the field of the above-described fabricated parts, the molding materials or molded articles are required to have well-balanced physical properties, such as moldability, dimensional accuracy, appearance, mechanical properties, e.g., tensile strength and bending strength, heat resistance, and the like. In particular, a good balance between appearance, such as surface gloss, and impact strength is demanded from the nature of exterior parts.

In general, impact strength includes Izod impact strength, Du Pont dart drop impact strength indicative of areal impact strength, etc. With the above-described particular purpose, the areal impact strength is considered more significant for practical use.

In an attempt of improving impact strength of rubber-modified styrene resins, a number of studies have hitherto been made. Known techniques include, for example, a method of blending a styrene-butadiene block copolymer and a method of blending an organopolysiloxane.

According to these known techniques, however, the amount of the modifier resin to be blended, such as the styrene-butadiene block copolymer, is relatively large, usually amounting to several percents or even more. As a result, it is very likely to deteriorate physical properties other than impact strength. In case of using the organopolysiloxane as a modifier, expected effects can be produced with a relatively small amount (less than 1%) to be blended so that serious deterioration in other physical properties is not observed. However, it is chiefly notched Izod impact strength that is improved by blending the organopolysiloxane, while the improving effect on areal impact strength, such as Du Pont dart drop impact strength, that seems practically more important, is still insufficient.

SUMMARY OF THE INVENTION

One object of this invention is to provide a styrene resin composition having an improved areal impact strength by blending a relatively small amount of a modifier, as well as other excellent performances required for exterior parts, such as surface gloss, moldability, and the like.

The present invention relates to a rubber-modified styrene resin composition comprising (A) a rubber-modified styrene resin having dispersed therein from 1 to 15% by weight of a rubbery polymer having an average particle size of from 0.1 to 2.5 μm, (B) from 0.01 to 0.2% by weight, on silicon conversion based on the rubber-modified styrene resin, of an organopolysiloxane, and (C) from 0.05 to 10% by weight, based on the styrene resin, of an ethylene-unsaturated carboxylic acid ester copolymer.

DETAILED DESCRIPTION OF THE INVENTION

The rubbery polymer which can be contained in the rubber-modified styrene resin (A) of the invention includes polybutadiene, a butadiene-styrene copolymer, polyisoprene, butyl rubber, ethylene-propylene-diene terpolymer (EPDM) rubber, an ethylene-propylene copolymer, natural rubber, etc. There is no limitation on the structures of higher order of these polymers, such as a cis-1,4 bond content and a 1,2-vinyl bond content of polybutadiene or a butadiene-styrene copolymer, a styrene content and a butadiene-styrene bonding style (e.g., random, block, or alternating) of a butadiene-styrene copolymer, and the like.

If the rubbery polymer content in the rubber-modified styrene resin (A) of the invention is less than 1% by weight, a sufficient improvement in impact strength cannot be attained. If it exceeds 15% by weight, physical properties other than impact strength, such as stiffness, heat resistance, etc., are deteriorated.

The dispersed rubbery polymer particles have an average particle size of from 0.1 to 2.5 μm. An average particle size of less than 0.1 μm cannot bring about sufficient improvement in impact strength, and that of greater than 2.5 μm deteriorates surface gloss essentially required for exterior parts.

The term "average particle size" as used herein means a number average particle size determined by classifying about 500 rubbery polymer particles at 0.01 μm intervals in an electron photomicrograph of a very thin section of the rubber-modified styrene resin composition.

The composition of the present invention contains (B) an organopolysiloxane in an amount of from 0.01 to 0.2% by weight on silicon conversion based on the rubber-modified styrene resin (A). A silicon content of less than 0.01% by weight does not bring about sufficient improvement in impact strength, and a silicon content of more than 0.2% by weight deteriorates other physical properties, such as stiffness, heat resistance, and the like.

The organopolysiloxane (B) which can be used in the present invention is generally represented by the following formula:

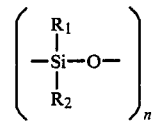

wherein $R_1$ and $R_2$ each represents an alkyl group, an aryl group, or an aralkyl group; and n represents a degree of polymerization.

The organopolysiloxane may have an epoxy group, an amino group, a carboxyl group, a vinyl group, a hydroxyl group, a fluorine atom, or an alkoxy group introduced to the terminal(s) or molecular chain(s) thereof.

The organopolysiloxane (B) may have any structure of homopolymer, random polymer, block polymer, and graft polymer, and a part of the organic groups thereof may be substituted with a hydroxyl group, an alkoxy group, a hydroxyalkyl group, or a polyhydroxyalkylene group. These organopolysiloxanes may be used either individually or in combination of two or more thereof.

Specific but non-limiting examples of the organopolysiloxane (B) to be used include dimethylpolysiloxane, methylphenylpolysiloxane, diphenylpolysiloxane, and the like.

The viscosity of the organopolysiloxane is not particularly limited, but those having a viscosity ranging from about 10 to about 100,000 cSt. at 30° C. are usually preferred in view of ease on handling. That is, those having a viscosity less than 10 cSt. are unsuitable due to high volatility, while viscosities higher than 100,000 cSt. make it difficult to uniformly disperse the organopolysiloxane in the composition.

Compounding of the organopolysiloxane can be effected at any stage of the production of the rubber-modified styrene resin composition, e.g., at the beginning of the polymerization, during the polymerization, at the stage of extrustion, at the stage of molding, and the like. These methods of compounding may be combined.

The composition according to the present invention further contains (C) from 0.05 to 10% by weight of an ethylene-unsaturated carboxylic acid ester copolymer. If the content of the component (C) is less than 0.05% by weight, sufficient effects in improving impact strength cannot be produced. If it exceeds 10% by weight, other physical properties, such as heat resistance, are deteriorated.

Specific examples of the unsaturated carboxylic acid ester segment in the ethylene-unsaturated carboxylic acid ester copolymer (C) include ethyl acrylate, methyl acrylate, 2-ethylhexyl acrylate, strearyl acrylate, methyl methacrylate, ethyl methacrylate, 2-ethylhexyl methacrylate, stearyl methacrylate, etc. Specific examples of preferred ethylene-unsaturated carboxylic acid ester copolymers include an ethylene-ethyl acrylate copolymer, an ethylene-methyl acrylate copolymer, and an ethylene-ethyl methacrylate copolymer. The copolymer preferably has an unsaturated carboxylic ester content of from 5 to 45% by weight and a melt flow rate (JIS K-6730) of from about 1 to about 500 g/10 min, but these values are not essential.

Addition of the ethylene-unsaturated carboxylic acid ester copolymer to the composition can be carried out easily by methods commonly employed for thermoplastic resins, such as melt-blending and solution blending.

The rubber-modified styrene resin (A) which can be used in the invention includes a rubber-modified polystyrene resin, a so-called high-impact polystyrene, an ABS resin, a polymer blend of a rubber-modified polystyrene resin and a polyphenylene oxide resin, a so-called modified polyphenylene oxide resin, and the like, with rubber-modified polystyrene resins being preferred.

In order to impart non-flammability or self-extinguishing properties to the composition of the invention, a flame-retardant can be compounded to obtain a flame-retarded thermoplastic resin composition.

The composition according to the present invention can further contain various compounding additives, such as plasticizers, stabilizers, antioxidants, pigments, dyes, dropping retarders, treatment auxiliaries, mineral fillers, fibrous, particulate, flaky or pulverized glass, and the like.

This invention will now be illustrated in greater detail with reference to the following examples, but it should be understood that they are not intended to limit the present invention.

EXAMPLES 1 TO 6 AND COMPARATIVE EXAMPLES 1 TO 4

A rubber-modified polystyrene (Esbrite® 500HG produced by Sumitomo Chemical Co., Ltd.) (A), a silicone oil (Toray Silicone® SH-200 produced by Toray Industries, Inc.) (B), and an ethylene-methyl acrylate copolymer (Acryft® produced by Sumitomo Chemical Co., Ltd.) (C) were mixed at a proportion shown in Table 1 and sufficiently dispersed in a Henschel mixer. The premixed compound was melt-kneaded in a single screw extruder having a diameter of 40 mm at a cylinder temperature of from about 160° to 220° C. and pelletized. Specimens for physical property measurements were prepared by means of an injection molding machine at a cylinder temperature of from 190° to 230° C. and at a mold temperature of 40° C. Measurements of physical properties of the compositions were in accordance with the following criteria.

(1) Izod Impact Strength (notched): ASTM D256-70 (thickness: ¼ in.)
(2) Du Pont Dart Drop Impact Strength: JIS K-7211 (thickness: 1 mm)
(3) Melt Flow Rate: JIS K-6870 (200° C.; load: 5 kg)
(4) Surface Gloss: JIS Z-8741
(5) Vicat Softening Point: JIS K-6870 (load: 5 kg)

The results of these measurements are shown in Table 1 below.

TABLE 1

| | Example No. | | | | | | Comparative Example No. | | | |
|---|---|---|---|---|---|---|---|---|---|---|
| | 1 | 2 | 3 | 4 | 5 | 6 | 1 | 2 | 3 | 4 |
| Composition (part by weight): | | | | | | | | | | |
| (A) | 100 | 100 | 100 | 100 | 100 | 100 | 100 | 100 | 100 | 100 |
| (B) | 0.05 | 0.05 | 0.05 | 0.05 | 0.05 | 0.05 | — | 0.05 | — | — |
| (C)* | 0.1 | 0.5 | 1.0 | 0.1 | 0.5 | 1.0 | — | — | 0.1 | 1.0 |
| Rubbery Polymer Content in (A) (%) | 8 | 8 | 8 | 8 | 8 | 8 | 8 | 8 | 8 | 8 |
| Particle Size of Rubbery Dispersed Particles in (A) (μm) | 0.8 | 0.8 | 0.8 | 0.8 | 0.8 | 0.8 | 0.8 | 0.8 | 0.8 | 0.8 |
| Izod Impact Strength (kg · cm/cm) | 7.8 | 7.8 | 7.6 | 7.9 | 7.7 | 7.7 | 6.0 | 7.8 | 6.0 | 5.8 |
| Du Pont Dart Drop Impact Strength (kg · cm) | 18.0 | 22.5 | 28.0 | 18.5 | 22.0 | 29.5 | 4.8 | 5.9 | 3.8 | 3.3 |
| Melt Flow Rate (g/10 min) | 3.9 | 4.0 | 4.0 | 4.2 | 4.2 | 4.3 | 3.9 | 3.9 | 4.0 | 4.0 |

TABLE 1-continued

|  | Example No. | | | | | | Comparative Example No. | | | |
| --- | --- | --- | --- | --- | --- | --- | --- | --- | --- | --- |
|  | 1 | 2 | 3 | 4 | 5 | 6 | 1 | 2 | 3 | 4 |
| Vicat Softening Point (°C.) | 94 | 94 | 94 | 94 | 94 | 94 | 94 | 94 | 95 | 94 |
| Surface Gloss (%) | 97 | 97 | 98 | 96 | 97 | 97 | 96 | 96 | 96 | 97 |

*Note:
The ethylene-methyl acrylate copolymer (C) used in Examples 1 to 3 and Comparative Examples 3 to 4 had a melt flow rate of 2.5 g/10 min and a methyl acrylate content of 18 wt %, and that used in Examples 4 to 6 had a melt flow rate of 7 g/10 min and a methyl acrylate content of 38 wt %.

As described above, the styrene resin composition in accordance with the present invention shows decided superiority in areal impact strength over the conventional rubber-modified styrene composition as well as excellent performances required for exterior parts, such as surface gloss, moldability, and the like.

While the invention has been described in detail and with reference to specific embodiments thereof, it will be apparent to one skilled in the art that various changes and modifications can be made therein without departing from the spirit and scope thereof.

What is claimed is:

1. A rubber-grafted styrene resin composition comprising (A) a rubber-grafted styrene resin having dispersed therein from 1 to 15 wt% by weight of a rubbery polymer having an average particle size of from 0.1 to 2.5 μm, (B) an organopolysiloxane in an amount of from 0.01 to 0.2% by weight on silicon conversion based on the rubber-modified styrene resin, and (C) an ethylene-unsaturated carboxylic acid ester copolymer having an unsaturated carboxylic acid content of from 5 to 45% by weight in an amount of from 0.05 to 10% by weight based on the rubber-modified styrene resin.

2. A rubber-grafted styrene resin composition as in claim 1, wherein said rubber-grafted styrene resin is a rubber-grafted polystyrene resin.

3. A rubber-grafted styrene resin composition as in claim 1, wherein said ethylene-unsaturated carboxylic acid ester copolymer (C) is an ethylene-ethyl acrylate copolymer, an ethylene-methyl acrylate copolymer, an ethylene-ethyl methacrylate copolymer, or a mixture thereof.

* * * * *